2,851,441
POLYBUTADIENE POLYHYDRIC PHENOL RESIN

Frank P. Greenspan, Buffalo, and Rupert E. Light, Jr., Kenmore, N. Y., assignors to Food Machinery and Chemical Corporation, San Jose, Calif.

No Drawing. Application June 13, 1956
Serial No. 591,018

13 Claims. (Cl. 260—47)

This invention relates to compositions useful in the preparation of synthetic, thermoset resinous products and to these products, and particularly to thermoset castings, moldings, coatings, and the like derived from modified polybutadienes.

Because of its ready availability and its physical properties, polybutadiene is a potentially useful raw material for the production of thermoset synthetic resinous products. Although it is possible to use polybutadiene directly for making coatings, these coatings are not entirely satisfactory, usually showing lack of adhesion and lack of toughness. Particularly difficult is the production of useful castings from polybutadiene.

It has been found in accordance with the present invention that a polybutadiene can be modified by reaction with a lower aliphatic peracid to produce a stable, complex, thermoplastic reaction product having reactive epoxy and hydroxy groups and acyloxy groups, and subsequently converted to thermoset condition by reaction with a polyhydroxy phenol. The composition of the present invention, from which the thermoset resinous product is derived, comprises a mixture of the thermoplastic reaction product with a polyhydroxy phenol.

The composition and thermoset resinous product of this invention are prepared by a series of steps which will be more fully discussed individually hereinafter. In principle, a polybutadiene first is treated with a lower aliphatic peracid having 1 to 10 carbon atoms. The product of this reaction normally contains reactive epoxy and hydroxy groups and acyloxy groups. However, although it contains highly reactive functional groups, the reaction product is thermoplastic and can be stored for extended periods without losing this thermoplasticity. At some time following its preparation the thermoplastic reaction product is blended with a polyhydroxy phenol and the resulting mixture is employed in the production of thermoset resinous products. This last treatment is carried out under conditions which are directly suitable for the production of castings, coatings and the like. If it be desired to produce a casting, the reaction product resulting from treating polybutadiene with a lower aliphatic peracid is mixed with a suitable polyhydroxy phenol and the mixture is poured into a mold. The mixture in the mold then is heated and thereby caused to set to a casting having properties ranging from rubbery to hard and tough, depending on the particular polybutadiene-lower aliphatic peracid reaction product and polyhydric phenol employed.

If it be desired to form a coating, the product obtained by treating polybutadiene with a lower aliphatic peracid is mixed in solvent solution with a suitable polyhydroxy phenol and this solvent mixture then applied to the surface to be coated and the coating heated. Upon evaporation of the solvent and reaction of the residue, an adherent coating having properties ranging from rubbery to hard and tough, and determined by the choice of polybutadiene-lower aliphatic peracid reaction product and polyhydric phenol, is obtained.

Polybutadienes generally can be used as the raw material in the process of this invention. Production of useful polybutadiene-lower aliphatic peracid reaction products in the sense of this invention requires a starting material of a certain minimum chain length, i. e. degree of polymerization. No theoretical upper limit exists for the chain length of the unsaturated starting material to be oxidized in accordance with this invention. However, there are certain practical considerations which impose a limit on the degree of polymerization of the starting material. Because of the reaction of the polybutadiene with a lower aliphatic peracid has to be carried out in the liquid phase, the starting material must either be a liquid or must be soluble in a suitable reaction medium. Many highly polymerized compounds are solids of little or no solubility in otherwise useful solvents and in this respect, a practical upper limit is imposed on the degree of polymerization of the starting material. In other words, the practical requirement imposed by the need of working in the liquid phase limits the choice of starting material. However, the degree of polymerization of the starting material will also have to be considered in connection with the properties desired in the reaction products. A highly polymerized starting material will produce a reaction product of somewhat different properties than would be obtained by the use of a starting material of a lower degree of polymerization.

The physical state of polybutadiene is determined by its degree of polymerization and molecular weight. Any liquid or properly soluble polybutadiene may be used. Generally speaking, however, polybutadienes having the requisite solubility will have a molecular weight no higher than about 250,000. Preferably the molecular weight of the polybutadiene should be in the range of about 250 to 10,000.

The polybutadiene can be polymerized by any known method, for example emulsion, solution or bulk polymerization. However, it is preferred to employ a polybutadiene polymerized in solution in the presence of a catalytic amount of finely divided sodium. Polybutadienes having molecular weights in the preferred molecular weight range can be prepared readily by this method, and these products can be reproduced without difficulty.

The reaction of the polybutadiene is carried out in accordance with this invention by treating it with a lower aliphatic peracid. Suitable peracids are the aliphatic peracids having 1 to 10 carbon atoms. The reaction may be carried out using a preformed peracid or the peracid may be formed from its constituents during the reaction and in the reaction medium. In either case the reaction should be carried out under conditions favoring the protection of epoxy groups formed, for example in the case of the preformed peracid reaction, the reaction should be run at moderate temperatures, e. g. below about 75° C., and for only a few hours.

When reacting the polybutadiene with the lower aliphatic peracid, stoichiometric amounts of the peracid or amounts below that theoretically required completely to react with the double bonds present in the polybutadiene may be used. It is important, however, that the reaction product contain at least about 1% of oxirane oxygen in order that it will be highly reactive with the polyhydric phenol in forming thermoset products. In the following examples, polybutadienes treated with the stoichiometric amount of lower aliphatic peracid will be designated as "100% reacted," and their oxirane oxygen contents given. Polybutadienes reacted with reduced amounts of peracid will be designated by a percent figure to indicate what might be termed the degree of reaction in terms of the fraction of the theoretical amount of peracid used, and their oxirane oxygen contents likewise will be given. The reactivity and resin forming properties of the polybutadiene-lower aliphatic peracid reaction product will obviously vary with its degree of reaction with the lower aliphatic peracid, and with the amount of highly reactive oxirane oxygen which it contains. Generally speaking, a 100% reacted polybutadiene having a high oxirane oxygen content will be more reactive with the herein polyhydroxy phenols and will more readily form a casting or coating than will polybutadiene reacted to a lesser extent. At the same time the properties of the finished casting or coating will also be influenced to an extent by the degree of the reaction of the polybutadiene.

As indicated above, the polybutadiene-lower aliphatic peracid reaction product is treated at some time subsequent to its preparation, with a polyhydroxy phenol. Suitable polyhydroxy phenols include resorcinol, catechol, hydroquinone, 4,4'-dihydroxy diphenyl sulfone, and the alkyl bisphenols such as 4,4'-dihydroxy diphenyl propane. Another group of useful polyhydroxy phenols, that is, phenolic compounds containing multiple phenolic hydroxy groups, are the A or B stage phenol-aldehyde condensates. The phenolic hydroxy groups in the polyhydric phenols can be present on one or more aromatic rings, and the molecules containing them can contain other active hydrogen containing functional groups reactive with oxirane oxygen. Likewise, the polyhydroxy phenols can be chosen for their ability to crosslink among themselves with or without added ingredients, e. g. hexamethylenetetramine, thereby augmenting the thermosetting reaction between the phenols and the epoxy containing polymer. Certain limitations on the choice of such polyhydroxy phenols are, however, imposed by the practical process requirements. If casting resins are to be produced, the polybutadiene reaction product has to be mixed with such polyhydroxy phenols before casting and heating. To permit proper mixing and use, the two main ingredients, the polybutadiene reaction product and the polyhydroxy phenol, should combine to give a liquid, pourable mixture at room or moderately elevated temperature. Therefore, in the case of casting resins, the polyhydroxy phenols should be those liquid at ordinary temperature, those which possess a relatively low melting point to permit mixing at room temperature or at moderately elevated temperature, or those which are soluble in the polybutadiene-lower aliphatic peracid reaction product. In the case of coating resins, a solvent is invariably used from which the coating is then obtained by evaporation. In this case the polyhydroxy phenols used are those soluble in the solvent from which the coating is to be made.

The amount of polyhydroxy phenol to be used for treating the polybutadiene-lower aliphatic peracid reaction product depends on the oxirane oxygen content of the polybutadiene-lower aliphatic peracid reaction product, the particular polyhydroxy phenol used, and the properties desired in the thermoset resinous product. The amount to be used is calculated on the basis of equivalent weights. In cases where full reaction is desired, one equivalent weight of the polybutadiene-lower aliphatic peracid reaction product, that is, the weight of reaction product containing 16 g. of oxirane oxygen, is treated with one equivalent weight of the polyhydroxy phenol. The equivalent weight of the polyhydroxy phenol is here defined as the molecular weight of the polyhydroxy phenol divided by the number of phenolic hydroxy groups contained in it. The amount of polyhydroxy phenol calculated in this way represents the theoretical amount for complete reaction. For example, if a sample of polybutadiene-lower aliphatic peracid reaction product is found by analysis to contain 6.6 g. of oxirane oxygen per 100 gram of the reaction product, its equivalent weight will then be $$\frac{100 \times 16}{6.6}$$

or 242 gram. If this product is to be treated with, e. g. resorcinol, calculation shows that the equivalent weight of this polyhydroxy phenol is $$\frac{110}{2}$$

or 55 gram. The theoretical amount of resorcinol to be used with this particular polybutadiene reaction product would then be $$\frac{55}{242}$$

or 0.226 gram of polyhydroxy phenol per gram of the reaction product.

In accordance with this invention, from 10 to 100% of the calculated theoretical amount of polyhydroxy phenol may be used in the production of the new casting or coating resins of this invention. The amount of reaction between any given polybutadiene-lower aliphatic peracid reaction product and the polyhydroxy phenol will determine largely its degrees of solvent and heat resistances and hardness, and is dependent both on the amount of oxirane oxygen in the polybutadiene reaction product and the amount of polyhydroxy phenol used.

The following examples will illustrate in some detail the principle of this invention.

*Example 1*

1,000 g. of a liquid polybutadiene was dissolved in 1,000 g. of toluene. To this solution was added 167 g. of formic acid, and 467 g. of 50% hydrogen peroxide. The amount of hydrogen peroxide used corresponds to approximately 50% of the stoichiometric amount required fully to epoxidize the polybutadiene. This mixture was then maintained with constant stirring at a temperature of about 65° C. for about 5 hours. The reaction batch then was washed with a saturated aqueous sodium sulfate solution, dried over sodium sulfate, and stripped of solvent at reduced pressure. The epoxy content of the product was 5.23%.

100 g. of the product was then mixed with 18 g. of resorcinol, and the mixture was poured into a mold and baked for 8 hours at 140° C. The amount of resorcinol was 100% of the stoichiometric amount required for full reaction with the epoxidized polybutadiene. The baked product then was cooled and removed from the mold, and found to be a moderately hard, tough casting.

*Example 2*

100 g. of the epoxidized polybutadiene of Example 1 was mixed with 9 g. of resorcinol, and the mixture was poured into a mold and baked at 140° C. for 8 hours. The amount of resorcinol corresponded to 50% of the stoichiometric amount required for full reaction with the epoxidized polybutadiene. The baked product then was cooled and removed from the mold, being recovered as a rubbery, tack free casting.

*Example 3*

100 g. of the epoxidized polybutadiene of Example 1 was mixed with 2.7 g. of resorcinol, and the mixture was poured into a mold and baked at 140° C. for 8 hours. The amount of resorcinol corresponded to 15% of the stoichiometric amount required for full reaction with the epoxidized polybutadiene. The baked product then was cooled and removed from the mold, being recovered as a rubberlike, tack free product.

*Example 4*

100 g. of a polybutadiene, having a viscosity of 1500 cp. at 100° F., was dissolved in 100 ml. of benzene. To this solution was added slowly, over a period of about one hour, 275 g. of 40% peracetic acid. This amount of peracetic acid corresponds to the stoichiometric amount required fully to epoxidize the polybutadiene. The temperature was maintained at about 20° to 25° C. over a total reaction time of 3 hours 45 minutes. The product then was washed with alkaline sodium chloride aqueous solutions, and finally with distilled water. The mixture was filtered and excess solvent was removed at reduced pressure. The solvent free product then was dried in a vacuum desiccator. The product was analyzed and found to contain 6.6% oxirane oxygen.

10 g. of epoxidized polybutadiene then was dissolved in 90 ml. of benzene, and 2.3 g. of catechol was dissolved in this solution. This amount of catechol corresponds to 100% of the stoichiometric amount required for full reaction with the epoxidized polybutadiene. The solution then was coated on a glass plate, and baked at 150° C. for 2 hours. The film resulting from this treatment was a very hard, extremely tough and strongly adherent product.

*Example 5*

25 g. of a polybutadiene having a viscosity of 1500 cp. at 100° F., was dissolved in 75 g. of toluene. To this solution was added slowly, over a period of about one hour, 48.8 g. of 64% perpelargonic acid. This amount of peracid corresponds to 50% of the stoichiometric amount required fully to epoxidize the polybutadiene. The temperature was maintained at about 35° C. during the reaction, which took place over a period of 90 minutes. The reaction batch was washed free of acid over an anion exchange resin, Amberlite IRA 410, by stirring the reaction batch in a solution of the resin. The Amberlite IRA 410 is a weakly basic, amine type ion exchange resin and is produced by the Resinous Products Division of the Rohm and Haas Company, Philadelphia, Pa. The reaction batch then was dried over magnesium sulfate, and the solvent was removed at reduced pressure. The product was analyzed and found to have an epoxy content of 7.24%.

10 g. of the product was dissolved in 90 ml. of toluene, and 2.5 g. of hydroquinone was dissolved in this solution. This amount of hydroquinone corresponds to 100% of the stoichiometric amount required for full reaction with the epoxidized polybutadiene. The solution was coated onto a glass plate, and baked at 150° C. for 2 hours. The film resulting from this treatment was a hard, tough and adherent film.

*Example 6*

35 g. of a rubbery polybutadiene was dissolved in 70 g. of toluene. To this solution, maintained at a temperature of 25° C., was added over a period of 15 minutes, 165 g. of 31.6% perbutyric acid. This amount of peracid corresponds to the stoichiometric amount required fully to epoxidize the polybutadiene. The temperature then was raised to about 40° C. and maintained at this level for one hour 45 minutes to complete reaction. The reaction batch then was washed several times with distilled water containing dilute sodium hydroxide, and the product finally was dried over magnesium sulfate, and residual solvent was removed under reduced pressure. The product was analyzed and found to contain 9.0% of oxirane oxygen.

10 g. of the epoxidized polybutadiene prepared as described above was dissolved in 90 ml. of toluene, and 6.0 g. of 4,4'-dihydroxy diphenyl propane was dissolved in the resulting solution. This amount of the diphenyl propane is the stoichiometric amount required for full reaction with the epoxidized polybutadiene. The solution then was coated on a glass plate, and baked at 150° C. for 2 hours. The film resulting from this treatment was extremely hard, tough and adherent.

*Example 7*

100 g. of a polybutadiene having a viscosity of 1500 cp. at 100° F. was dissolved in 100 ml. of benzene. To this solution was added slowly, over a period of 15 minutes, 35 g. of 40% peracetic acid. This amount of peracetic acid corresponds to 12.5% of the stoichiometric amount required fully to epoxidize the polybutadiene. The temperature was maintained during addition and for a period of 1¼ hours following addition, at about 20° to 25° C. The product then was washed with alkaline sodium chloride aqueous solution, and finally with distilled water. The mixture was filtered and excess solvent was removed at reduced pressure. The solvent-free product then was dried in a vacuum desiccator. The product was analyzed and found to contain 2.36% of oxirane oxygen. 10 g. of the epoxidized polybutadiene prepared as described above then was dissolved in 90 ml. of benzene and 1.7 g. of Bakelite BR 254 was dissolved in this solution. The Bakelite BR 254 is a 100%, para-phenyl-phenolic oil soluble resin, prepared by the reaction of para-phenylphenol with formaldehyde, and is produced by the Bakelite Division of Union Carbide and Carbon Corporation, 30 East 42nd Street, New York 17, N. Y. This amount of BR 254 corresponds to 100% of the stoichiometric amount required for full reaction with the epoxidized polybutadiene. The solution then was placed in a mold, the solvent was evaporated and the residue was baked at 150° C. for 8 hours. A semi-solid, rubber-like casting resulted.

What is claimed is:

1. Thermosetting, organic solvent soluble composition useful in the preparation of thermoset resinous products, said composition comprising (a) the reaction product of a polybutadiene having a molecular weight of 250 to 250,000 and containing as polymer forming units only butadienes, with a 1 to 10 carbon atom lower aliphatic peracid and containing at least 1% or oxirane oxygen, and (b) a polyhydric phenol, said polyhydric phenol being present in an amount of 10% to 100% of the stoichiometric amount required for complete reaction with the oxirane oxygen in said reaction product.

2. Thermosetting, organic solvent soluble composition useful in the preparation of thermoset resinous products, said composition comprising (a) the reaction product of a polybutadiene having a molecular weight of 250 to 250,000 and containing as polymer forming units only butadienes, with performic acid and containing at least 1% of oxirane oxygen, and (b) a polyhydric phenol, said polyhydric phenol being present in an amount of 10% to 100% of the stoichiometric amount required for complete reaction with the oxirane oxygen in said reaction product.

3. Thermosetting thermoplastic, organic solvent soluble composition useful in the preparation of thermoset resinous products, said composition comprising (a) the reaction product of a polybutadiene having a molecular weight of 250 to 250,000 and containing as polymer forming units only butadienes, with peracetic acid and containing at least 1% of oxirane oxygen, and (b) a polyhydric phenol, said polyhydric phenol being present in an amount of 10% to 100% of the stoichiometric amount required for complete reaction with the oxirane oxygen in said reaction product.

4. Thermosetting, organic solvent soluble composition useful in the preparation of thermoset resinous products, said composition comprising (a) the reaction product of a polybutadiene having a molecular weight of 250 to 250,000 and containing as polymer forming units only butadienes, with perpropionic acid and containing at least 1% of oxirane oxygen, and (b) a polyhydric phenol, said polyhydric phenol being present in an amount of 10% to 100% of the stoichiometric amount required for complete reaction with the oxirane oxygen in said reaction product.

5. Thermosetting, organic solvent soluble composition useful in the preparation of thermoset resinous products, said composition comprising (a) reaction product of a polybutadiene having a molecular weight of 250 to 250,000 and containing as polymer forming units only butadienes, with perbutyric acid and containing at least 1% of oxirane oxygen, and (b) a polyhydric phenol, said polyhydric phenol being present in an amount of 10% to 100% of the stoichiometric amount required for complete reaction with the oxirane oxygen in said reaction product.

6. Thermosetting, organic solvent soluble composition useful in the preparation of thermoset resinous products, said composition comprising (a) the reaction product of a polybutadiene having a molecular weight of 250 to 250,000 and containing as polymer forming units only butadienes, with a 1 to 10 carbon atom lower aliphatic peracid and containing at least 1% of oxirane oxygen, and (b) an uncured phenol-aldehyde condensate, said condensate being present in an amount of 10% to 100% of the stoichiometric amount required for complete reaction with the oxirane oxygen in said reaction product.

7. Thermosetting, organic solvent soluble composition useful in the preparation of thermoset resinous products, said composition comprising (a) the reaction product of a polybutadiene having a molecular weight of 250 to 250,000 and containing as polymer forming units only butadienes, and a 1 to 10 carbon atom lower aliphatic peracid and containing at least 1% of oxirane oxygen, and (b) a bisphenol, said bisphenol being present in an amount of 10% to 100% of the stoichiometric amount required for complete reaction with the oxirane oxygen in said reaction product.

8. Thermosetting, organic solvent soluble composition useful in the preparation of thermoset resinous products, said composition comprising (a) the reaction product of a polybutadiene having a molecular weight of 250 to 250,000 and containing as polymer forming units only butadienes, with a 1 to 10 carbon atom lower aliphatic peracid and containing at least 1% of oxirane oxygen, and (b) resorcinol, said resorcinol being present in an amount of 10% to 100% of the stoichiometric amount required for complete reaction with the oxirane oxygen in said reaction product.

9. Thermosetting, organic solvent soluble composition useful in the preparation of thermoset resinous products, said composition comprising (a) the reaction product of a polybutadiene having a molecular weight of 250 to 250,000 and containing as polymer forming units only butadienes, with a 1 to 10 carbon atom lower aliphatic peracid and containing at least 1% of oxirane oxygen, and (b) hydroquinone, said hydroquinone being present in an amount of 10% to 100% of the stoichiometric amount required for complete reaction with the oxirane oxygen in said reaction product.

10. Thermosetting, organic solvent soluble composition useful in the preparation of thermoset resinous products, said composition comprising (a) the reaction product of a polybutadiene having a molecular weight of 250 to 250,000 and containing as polymer forming units only butadienes, with a 1 to 10 carbon atom lower aliphatic peracid and containing at least 1% of oxirane oxygen, and (b) catechol, said catechol being present in an amount of 10% to 100% of the stoichiometric amount required for complete reaction with the oxirane oxygen in said reaction product.

11. Thermosetting, organic solvent soluble composition useful in the preparation of thermoset resinous products, said composition comprising (a) the reaction product of a polybutadiene having a molecular weight of 250 to 10,000 and containing as polymer forming units only butadienes, with a 1 to 10 carbon atom lower aliphatic peracid and containing oxirane oxygen, and (b) a polyhydric phenol said polyhydric phenol being present in an amount of 10 to 100% of the stoichiometric amount required for complete reaction with the oxirane oxygen in said reaction product.

12. Thermoset resinous product prepared from the composition of claim 1 by heating said composition until a thermoset resinous product has been produced.

13. Thermoset resinous product prepared from the composition of claim 11 by heating said composition until a thermoset resinous product has been produced.

References Cited in the file of this patent

UNITED STATES PATENTS

| | | |
|---|---|---|
| 2,528,360 | Greenlee | Oct. 31, 1950 |
| 2,660,563 | Banes et al. | Nov. 24, 1953 |

UNITED STATES PATENT OFFICE
CERTIFICATE OF CORRECTION

Patent No. 2,851,441

September 9, 1958

Frank P. Greenspan et al.

It is hereby certified that error appears in the printed specification of the above numbered patent requiring correction and that the said Letters Patent should read as corrected below.

Column 6, line 30, for "or oxirane" read -- of oxirane --; line 46, strike out "thermoplastic".

Signed and sealed this 27th day of January 1959.

(SEAL)
Attest:

KARL H. AXLINE
Attesting Officer

ROBERT C. WATSON
Commissioner of Patents